(12) United States Patent
Raff et al.

(10) Patent No.: US 8,587,951 B2
(45) Date of Patent: Nov. 19, 2013

(54) PORTABLE COMPUTER STRUCTURES

(75) Inventors: John Raff, Menlo Park, CA (US); Stewart Shannon Fields, Belmont, CA (US); Ron Hopkinson, Campbell, CA (US); Bartley K. Andre, Menlo Park, CA (US); Chris Ligtenberg, San Carlos, CA (US); Mi Zhou, San Jose, CA (US); Paul J. Wehrenberg, Palo Alto, CA (US); Brett W. Degner, Menlo Park, CA (US); John Brock, San Francisco, CA (US); Michelle Rae Goldberg, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/412,381

(22) Filed: Mar. 5, 2012

(65) Prior Publication Data

US 2012/0170213 A1  Jul. 5, 2012

Related U.S. Application Data

(63) Continuation of application No. 12/340,621, filed on Dec. 19, 2008, now Pat. No. 8,144,474.

(60) Provisional application No. 61/105,033, filed on Oct. 13, 2008.

(51) Int. Cl.
    *H05K 5/00* (2006.01)

(52) U.S. Cl.
    USPC ......................................................... 361/752

(58) Field of Classification Search
    USPC ................ 361/760, 752, 796, 730, 753, 799; 439/371, 368, 352, 373
    See application file for complete search history.

(56) References Cited

U.S. PATENT DOCUMENTS

| | | | |
|---|---|---|---|
| 3,568,139 A | 3/1971 | Delzer | |
| 4,224,383 A | 9/1980 | Taylor | |
| 4,270,827 A | 6/1981 | Potgieter | |
| 4,473,264 A | 9/1984 | Julian et al. | |
| 4,601,527 A * | 7/1986 | Lemke | 439/81 |
| 4,920,018 A | 4/1990 | Turner | |
| 4,991,058 A | 2/1991 | Watkins et al. | |
| 5,155,662 A | 10/1992 | I-Shou | |
| 5,169,338 A | 12/1992 | Dewar et al. | |
| 5,187,643 A | 2/1993 | I-Shou | |
| 5,323,291 A | 6/1994 | Boyle et al. | |
| 5,325,984 A | 7/1994 | Ady et al. | |
| 5,346,407 A | 9/1994 | Hood | |
| 5,566,048 A | 10/1996 | Esterberg et al. | |
| 5,572,402 A | 11/1996 | Jeong | |
| 5,590,024 A | 12/1996 | Honda et al. | |
| 5,670,267 A | 9/1997 | Lee | |
| 5,808,864 A | 9/1998 | Jung | |
| 5,895,440 A | 4/1999 | Proctor et al. | |
| RE36,381 E | 11/1999 | Boyle et al. | |

(Continued)

*Primary Examiner* — Javaid Nasri
(74) *Attorney, Agent, or Firm* — Treyz Law Group; David C. Kellogg; Kendall P. Woodruff

(57) ABSTRACT

Portable computer structures are provided. The portable computer structures may include connector structures. The portable computer may have a case. A portion of the connector structure may be formed by the case of the portable computer. The portable computer may have a circuit board with grounding spring-loaded pins which electrically ground the circuit board to the case of the portable computer. The portable computer may have an optical disk drive that is form fitted to mount to the portable computer case.

22 Claims, 9 Drawing Sheets

(56) References Cited

U.S. PATENT DOCUMENTS

| | | | |
|---|---|---|---|
| 6,068,520 A | 5/2000 | Winings et al. | |
| 6,249,426 B1 | 6/2001 | O'Neal et al. | |
| 6,297,946 B2 | 10/2001 | O'Neal et al. | |
| 6,304,060 B1 | 10/2001 | Dernichi | |
| 6,304,433 B2 | 10/2001 | O'Neal et al. | |
| 6,413,120 B1 | 7/2002 | Winings | |
| 6,477,035 B1 | 11/2002 | Cepas et al. | |
| 6,483,719 B1 | 11/2002 | Bachman | |
| 6,501,644 B1 | 12/2002 | Silverman et al. | |
| 6,532,150 B2 | 3/2003 | Sivertsen et al. | |
| 6,660,427 B1 | 12/2003 | Hukill et al. | |
| 6,751,484 B1 | 6/2004 | Sandelius et al. | |
| 6,781,827 B2 | 8/2004 | Goodman et al. | |
| 6,879,259 B1 | 4/2005 | Smith et al. | |
| 6,887,616 B2 | 5/2005 | Kim et al. | |
| 7,013,558 B2 | 3/2006 | Bachman | |
| 7,156,683 B2 | 1/2007 | Gupta et al. | |
| 7,207,826 B1 | 4/2007 | Yang | |
| 7,210,947 B1 * | 5/2007 | Fodero et al. | 439/95 |
| 7,273,383 B1 * | 9/2007 | Bennett | 439/142 |
| 7,639,187 B2 | 12/2009 | Caballero et al. | |
| 7,839,629 B2 | 11/2010 | Yeh | |
| 7,965,501 B2 | 6/2011 | Liang | |
| 2006/0012969 A1 | 1/2006 | Bachman | |
| 2006/0126286 A1 * | 6/2006 | Kim et al. | 361/683 |
| 2006/0141344 A1 | 6/2006 | Chen et al. | |
| 2006/0158070 A1 | 7/2006 | Woods et al. | |
| 2006/0172183 A1 | 8/2006 | Chen et al. | |
| 2007/0031727 A1 | 2/2007 | Hsu | |
| 2007/0111086 A1 | 5/2007 | Li et al. | |
| 2007/0117598 A1 | 5/2007 | Yang et al. | |
| 2007/0151751 A1 | 7/2007 | Robbins et al. | |
| 2008/0013268 A1 | 1/2008 | Wong et al. | |

* cited by examiner

PORTABLE COMPUTER STRUCTURES

This application is a continuation of patent application Ser. No. 12/340,621, filed Dec.19, 2008, now U.S. Pat. No. 8,144,474, which claims the benefit of provisional patent application No. 61/105,033, filed Oct. 13, 2008, both of which are hereby incorporated by reference herein in their entireties. This application claims the benefit of and claims priority to patent application Ser. No. 12/340,621, filed Dec. 19, 2008, now U.S. Pat. No. 8,144,474, and provisional patent application No. 61/105,033, filed Oct. 13, 2008.

BACKGROUND

This invention relates to electronic devices such as portable computers, and more particularly, to electronic device structures such as port connectors, grounding structures, and storage component mounting structures.

Designers of portable computers are faced with competing demands. It is generally desirable to reduce the weight of a portable computer, so that a user is not burdened by an overly heavy device. At the same time, durability and aesthetics should not suffer. Often, weight can be saved, but only at the expense of reducing the size or strength of device components. For example, communications ports, computer housing grounding arrangements, and storage device mounting arrangements in conventional portable computers may be more complex and may occupy more volume than is desired.

It would therefore be desirable to be able to provide improved electronic devices having improved structures for communications ports, circuit board grounding, and storage drive mounting.

SUMMARY

Portable computers and other electronic device may be provided that have improved communications port connectors, improved grounding arrangements, and improved drive mounting structures.

A portable computer may have a housing (case). A connector structure such as a connector for an Ethernet port may be formed in an opening in the housing. The portable computer housing may form a portion of the connector structure. For example, a metal wall portion of the portable computer housing may form a portion of an Ethernet jack that bears down upon a moveable portion of an Ethernet plug when the Ethernet cable plug (i.e., an RJ45 plug) is inserted into the Ethernet jack.

The portable computer may have an integrated circuit such as a printed circuit board. The printed circuit board may serve as a motherboard (mainboard) onto which integrated circuits and other components are mounted. The motherboard may have multiple spring-loaded grounding pins. The pins may extend vertically from the surface of the motherboard. When the motherboard is mounted in the portable computer, the pins may be compressed by the inner surface of the portable computer housing. This type of arrangement may be used to electrically ground the motherboard to the case of the portable computer.

The portable computer may have a component such as an optical disk drive or other storage component. The storage component may be configured to mate with a portion of the portable computer case. The optical disk drive or other component may have integral mounting structures formed from the drive housing with which the component is mounted directly to the case of the portable computer. This obviates the need to use separate mounting brackets to mount the component in the case.

Further features of the invention, its nature and various advantages will be more apparent from the accompanying drawings and the following detailed description of the preferred embodiments.

DETAILED DESCRIPTION

The present invention relates to electronic device structures such as communications port connectors, grounding structures, and storage component mounting structures. The electronic device structures may be provided (individually or in any suitable combination) in electronic devices such as handheld computers, mobile phones, or other suitable computing equipment. As an example, the electronic device structures may be provided in a portable computer.

Figure 1:
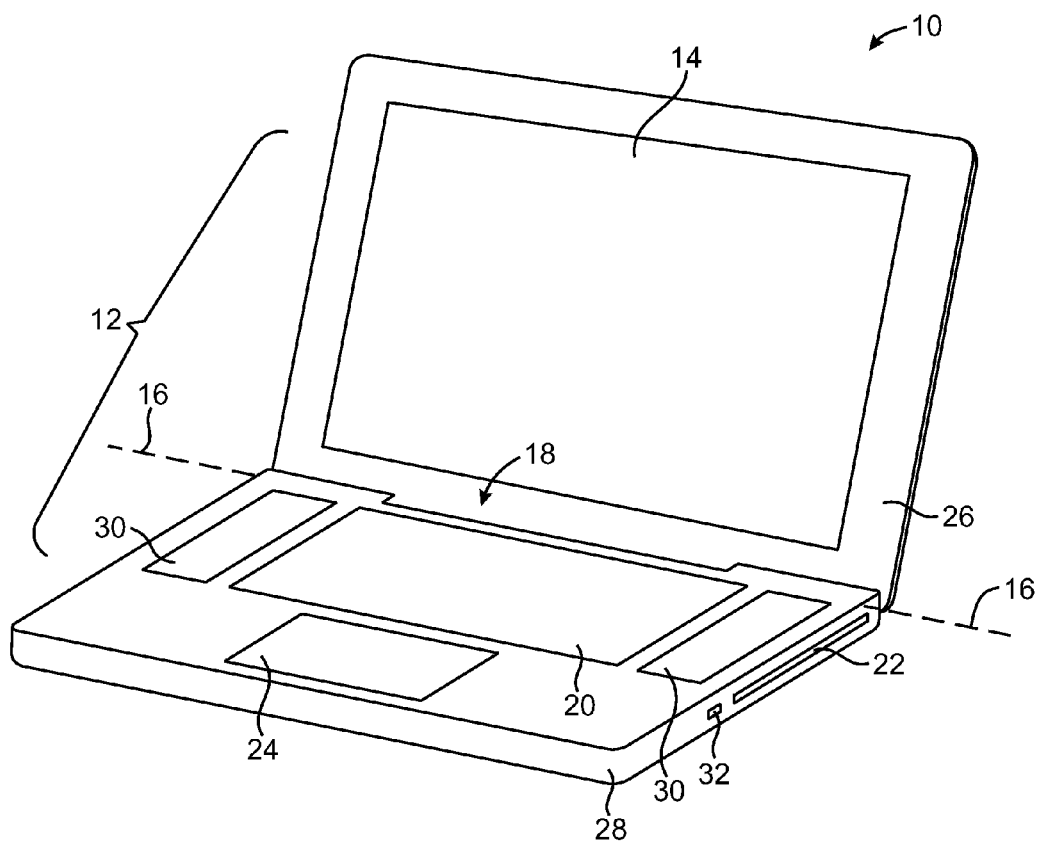
FIG. 1 is a perspective view of an illustrative portable computer in accordance with an embodiment of the present invention.

An illustrative electronic device such as a portable computer in which the electronic device structures may be provided is shown in FIG. 1. As shown in FIG. 1, portable computer 10 may have a housing 12. Housing 12, which is sometimes referred to as a case, may be formed from one or more individual structures. For example, housing 12 may have a main structural support member that is formed from a solid block of machined aluminum or other suitable metal. One or more additional structures may be connected to the housing 12. These structures may include, for example, internal frame members, external coverings such as sheets of metal, etc. Housing 12 and its associated components may, in general, be formed from any suitable materials such as such as plastic, ceramics, metal, glass, etc. An advantage of forming housing 12 at least partly from metal is that metal is durable and attractive in appearance. Metals such as aluminum may be anodized to form an insulating oxide coating.

Case 12 may have an upper portion 26 and a lower portion 28. Lower portion 28 may be referred to as the base or main unit of computer 10 and may contain components such as a hard disk drive, battery, and main logic board. Upper portion 26, which is sometimes referred to as a cover or lid, may rotate relative to lower portion 28 about rotational axis 16. Portions 26 and 28 may be formed from metal or other materials. For example, housing portions such as these may be milled from blocks of aluminum or constructed from other metals or conductive materials. Portion 18 of computer 10 may contain a hinge and associated clutch structures and is sometimes referred to as a clutch barrel.

Lower housing portion 28 may have a slot such as slot 22 through which optical disks may be loaded into an optical disk drive. Lower housing portion may also have a touchpad such as touchpad 24 and may have keys 20. Buttons and other controls may also be mounted to housing 12. If desired, additional components may be mounted to upper and lower housing portions 26 and 28. For example, upper and lower housing portions 26 and 28 may have ports to which cables can be connected (e.g., universal serial bus ports, an Ethernet port, a Firewire port, audio jacks, card slots, etc.). With one suitable arrangement, device 10 may have a connector such as port 32 to which a cable can be connected. In the FIG. 1 example, port 32 is located on the right side of lower housing portion 28. This is merely an example and, in general, port 32 may be located at any suitable location (e.g., on the left side of computer 10).

If desired, upper and lower housing portions 26 and 28 may have transparent windows through which light may be emitted (e.g., from light-emitting diodes). This type of arrangement may be used, for example, to display status information to a user.

Openings may be formed in the surface of upper and lower housing portions to allow sound to pass through the walls of housing 12. For example, openings such as openings 30 may be formed for microphone and speaker ports.

A display such as display 14 may be mounted within upper housing portion 26. Display 14 may be, for example, a liquid crystal display (LCD), organic light emitting diode (OLED) display, or plasma display (as examples). A glass panel may be mounted in front of display 14. The glass panel may help add structural integrity to computer 10. For example, the glass panel may make upper housing portion 26 more rigid and may protect display 14 from damage due to contact with keys or other structures.

Computer 10 may have input-output components such as touch pad 24. Touch pad 24 may include a touch sensitive surface that allows a user of computer 10 to control computer 10 using touch-based commands (gestures). A portion of touchpad 24 may be depressed by the user when the user desires to "click" on a displayed item on screen 14.

Figure 2:
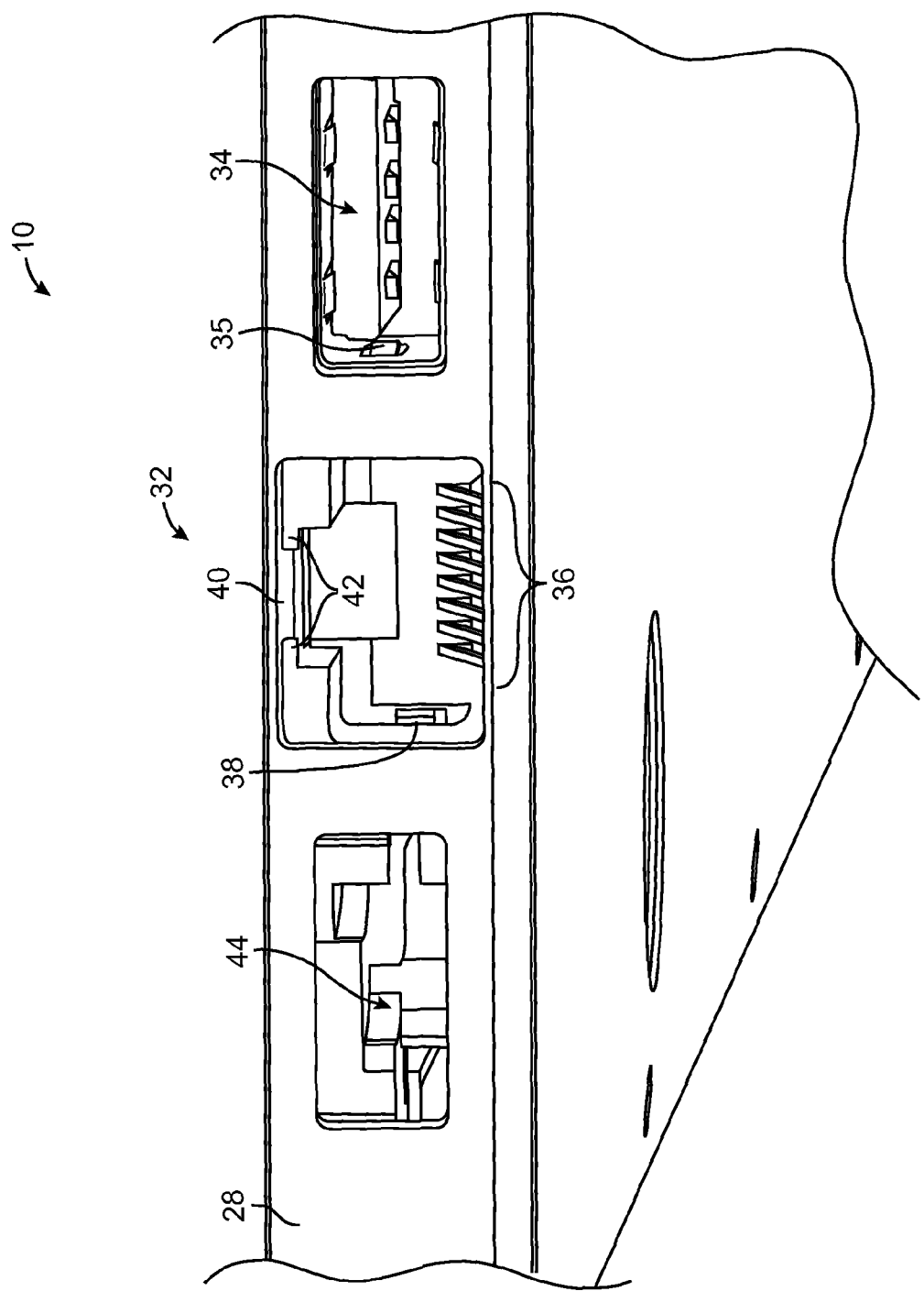
FIG. 2 is a perspective view of illustrative connector structures that may be provided in a portable computer in accordance with an embodiment of the present invention.

A perspective view of a connector structure that may be in a portable computer is shown in FIG. 2. As shown in FIG. 2, connector 32 may be formed in a side of lower housing portion 28 (e.g., the left hand side). Connector 34 may also be formed in the side of lower housing portion 28. Additional connectors may be formed in hole 44 of lower housing portion 28.

If desired, connectors such as connectors 32 and 34 may have grounding pins such as grounding pins 35 and 38. Grounding pins 35 and 38 may be used to electrically ground cables that are connected to connectors 32 and 34. As an example, a conductive outer portion of a cable that connects to connector 32 may bear against grounding pin 38 and electrically ground connector 32 to lower housing portion 28 and device 10.

Connector 32 may be any suitable type of connector. For example, connector 32 may be an Ethernet port connector, a telephone port connector, or any other suitable type of connector. Connector 32 may be referred to herein as an Ethernet port, but this is merely an example.

Ethernet port 32 may have electrical pin connectors 36 or other suitable electrical contacts that mate with corresponding electrical contacts on a cable connector. Electrical pin connectors 36 may be flexible metal strips which electrically connect to associated contacts on a cable when the plug portion of the cable (e.g., an RJ45 plug) is inserted into port 32. As an example, Ethernet port 32 may have eight metal strips 36 which connect to eight respective contacts on an Ethernet cable connector (RJ45 plug). Each metal strip 36 may be associated with one of eight conductive lines in the Ethernet cable.

A portion of port 32 such as an upper inner planar surface of port 32 may be formed from a planar sidewall portion of housing of device 10. For example, portion 40 of port 32 may be formed from lower housing portion 28 of device 10. Portion 40 of port 32 may bear against a moveable portion of a cable when the cable is inserted into port 32. With one suitable arrangement, the housing of device 10 is formed from a metal such as aluminum. Portions of the aluminum may form planar housing walls of about 1 mm in thickness. Portion 40 may be formed from this type of planar housing wall, other suitable sheets of housing material, or any other suitable housing structure.

Retaining clip structures associated with the Ethernet connector on the cable that connects to port 32 may engage portions 42 (retaining structures) of port 32 when the cable is connected to port 32. The retaining clip portions of the cable may be a part of the moveable portion of the cable (portions of which bear against portion 40 of port 32).

Figure 3:
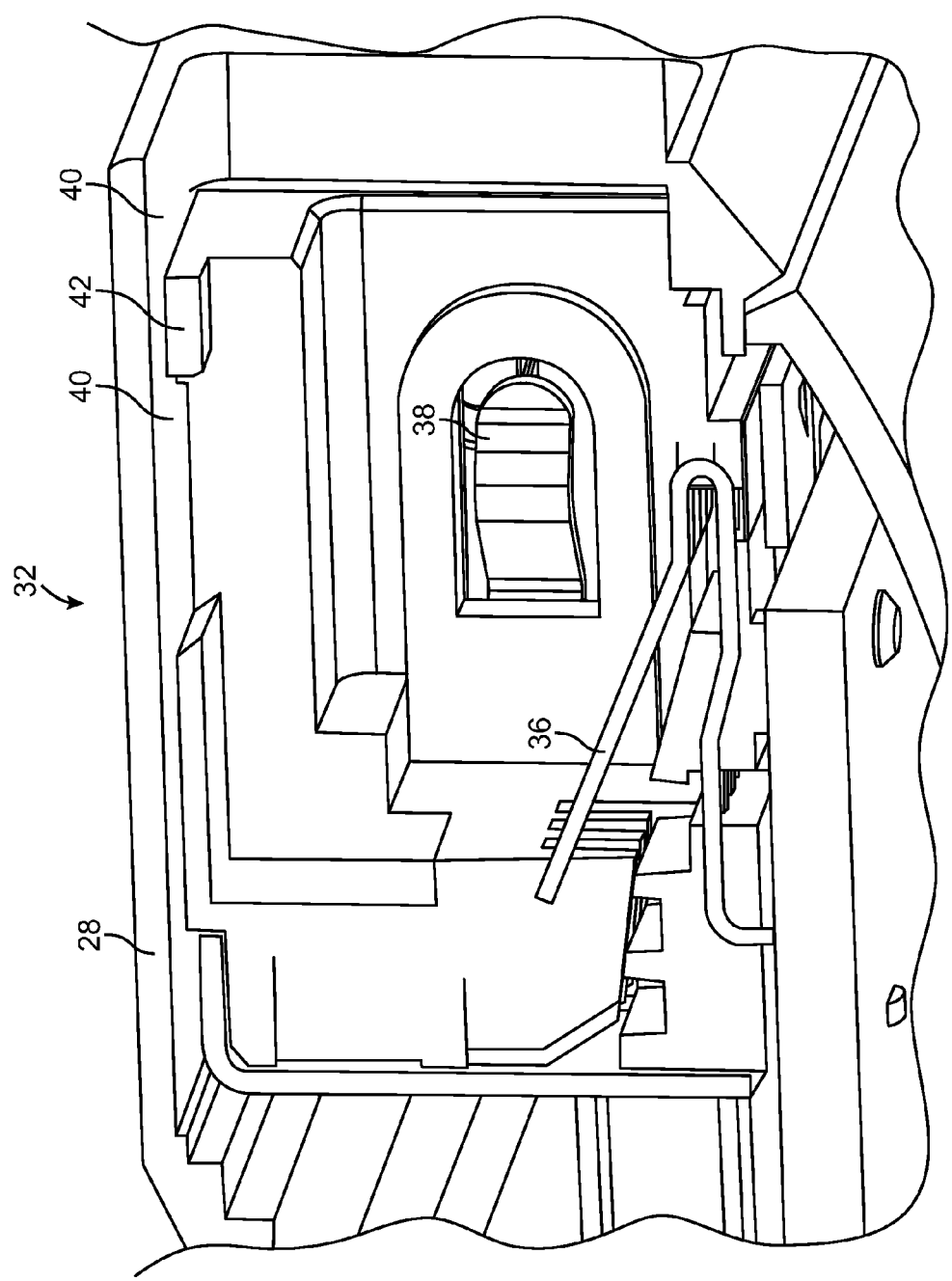
FIG. 3 is a cross-sectional perspective view of one of the illustrative connector structures of FIG. 2 in accordance with an embodiment of the present invention.

A cutaway view of port 32 is shown in FIG. 3. As illustrated in FIG. 3, housing wall portion 40 of lower housing portion 28 may form a portion of port 32 (i.e., an upper inner wall surface portion). As a connector for a cable is inserted into port 32, a moveable portion of the connector which extends outwards from the connector may bear against portion 40 and bend inwards.

After the connector has been fully inserted into port 32, retaining clip structures that are formed as part of the moveable portion of the connector may reside behind retaining structures 42 of port 32 (e.g., in the void of port 32 corresponding to portion 40 of lower housing port 28). If a force were to attempt to pull the connector out of port 32, the retaining clips on the cable connector will bear against the inner vertical walls of port retaining structures 42 and will resist the force attempting to remove the connector from port 32.

A user may remove the cable from port 32 by bearing down on the moveable portion of the cable such that the retaining clips of the cable are no longer engaged with portions 42 of port 32.

Figure 4:
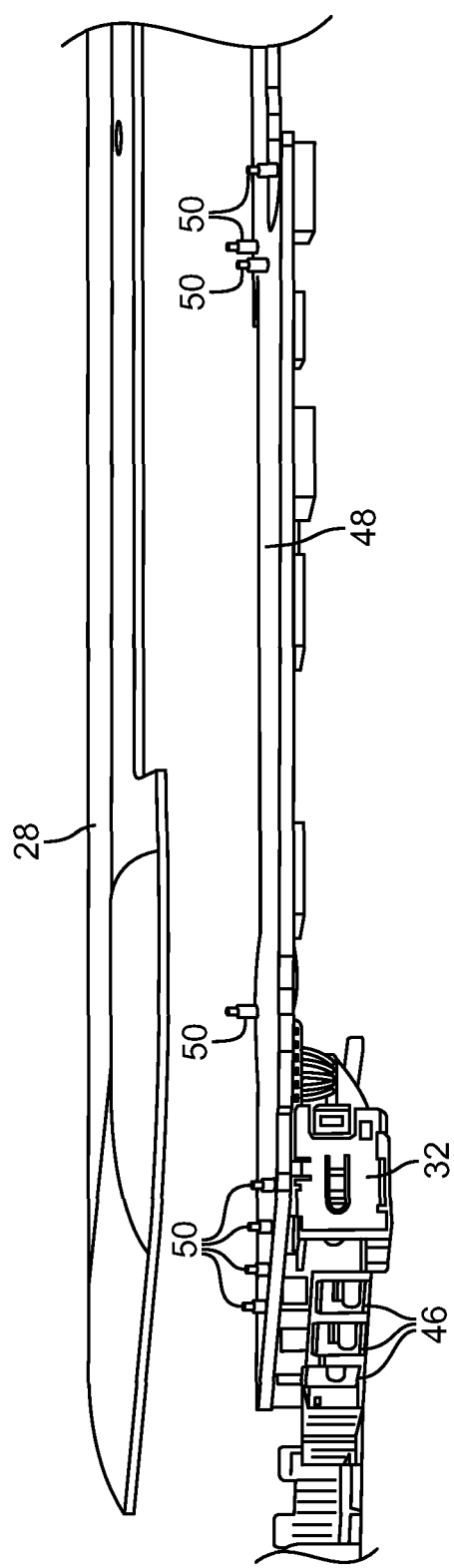
FIG. 4 is a side perspective view of an illustrative printed circuit board with spring-loaded pins that make connections to a portable computer case in accordance with an embodiment of the present invention.

As shown in FIG. 4, device 10 may have a printed circuit board such as printed circuit board 48. Printed circuit boards such as printed circuit board 48 of FIG. 4 are sometimes referred to as motherboards. As shown in FIG. 4, board 48 may be provided with spring-loaded pins 50 such as Pogo® pins used to electrically connect board 48 to housing 28 of device 10. Connectors such as Ethernet port 32 and connectors 46 (e.g., universal serial bus ports 46) may be mounted on motherboard 48.

Pins 50 may be used to electrically connect motherboard 48 to lower housing portion 28 of device 10, as an example. With one suitable arrangement, pins 50 may be electrically conductive regardless of whether pins 50 are compressed. Motherboard 48 may have any suitable number of pins 50 at any suitable locations. As one example, pins 50 may be concentrated in particular locations to enhance the grounding of motherboard 48 to the housing of device 10 at those locations. For example, pins 50 may be concentrated near a central processing unit on motherboard 48 (e.g., within a lateral distance of a centimeter or less or other suitable lateral spacing along the planar motherboard surface) to ensure that the central processing unit has access to a strong ground connection through pins 50.

Figure 5:
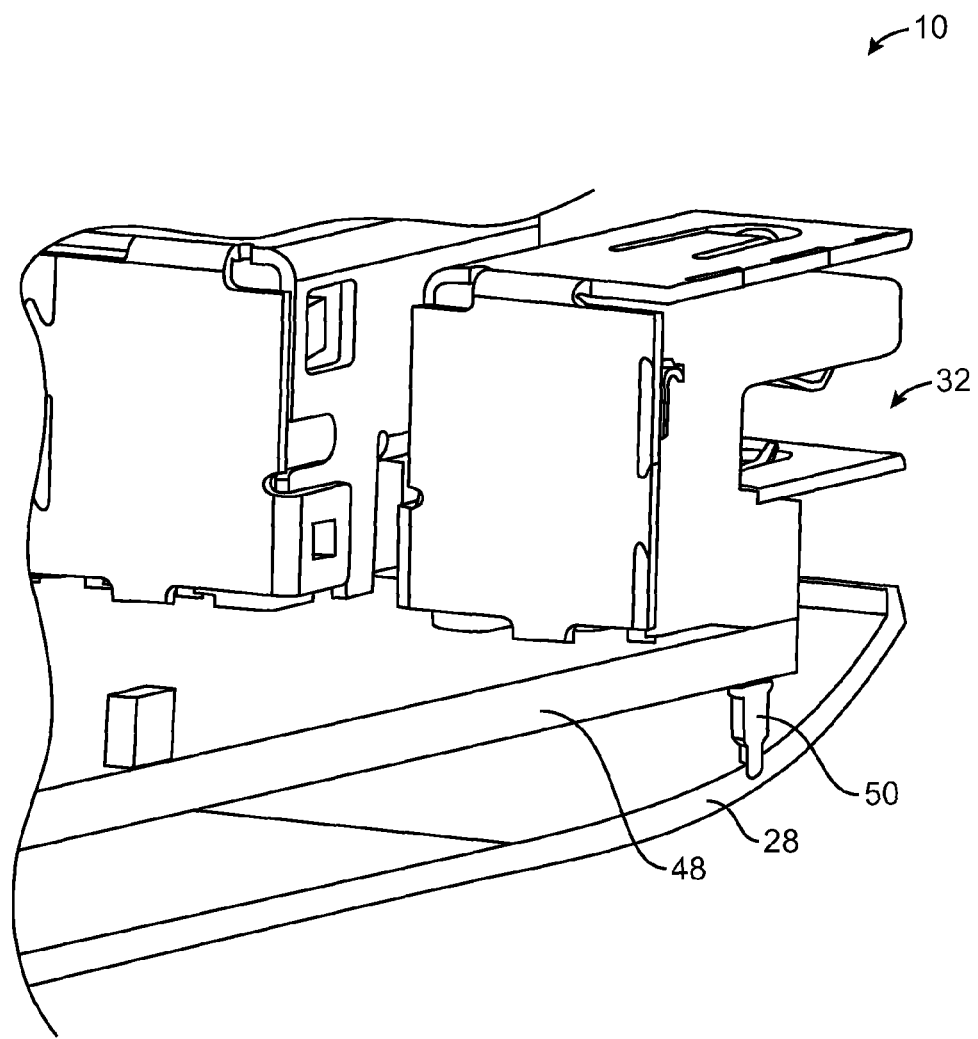
FIG. 5 is a cross-sectional perspective view of the illustrative printed circuit board with spring-loaded pins mounted to the portable computer case of FIG. 4 in accordance with an embodiment of the present invention.

As shown in FIG. 5, when motherboard 48 is mounted to lower housing portion 28 of device 10, pins 50 may be somewhat compressed and pins 50 may form an electrical path between lower housing portion 28 and motherboard 48. Pins 50 may form a path between grounding paths on motherboard 48 and lower housing portion 28. When housing portions such as housing portion 28 are formed from material such as anodized aluminum, laser machining or other suitable techniques may be used to selectively remove a portion the oxidized surface of housing 28 in the vicinity of pins 50. With this type of arrangement, the pins make electrical contact with exposed conductive surfaces of the conductive housing at the portions of the housing from which the oxidized surface (or other insulating coating) has been removed, thereby ensuring good electrical contact.

With one suitable arrangement, the use of pins 50 to ground motherboard 48 to the housing of device 10 may help to ensure that the motherboard is properly grounded. For example, even when motherboard 48 is not properly mounted (e.g., when less than the typical number of mounting screws have been used to mount motherboard 48 to housing portion 28) and motherboard 48 is not precisely in its nominal position relative to lower housing portion 28, pins 50 may help to ensure that motherboard 48 is still properly grounded to lower housing portion 28.

Figure 6:
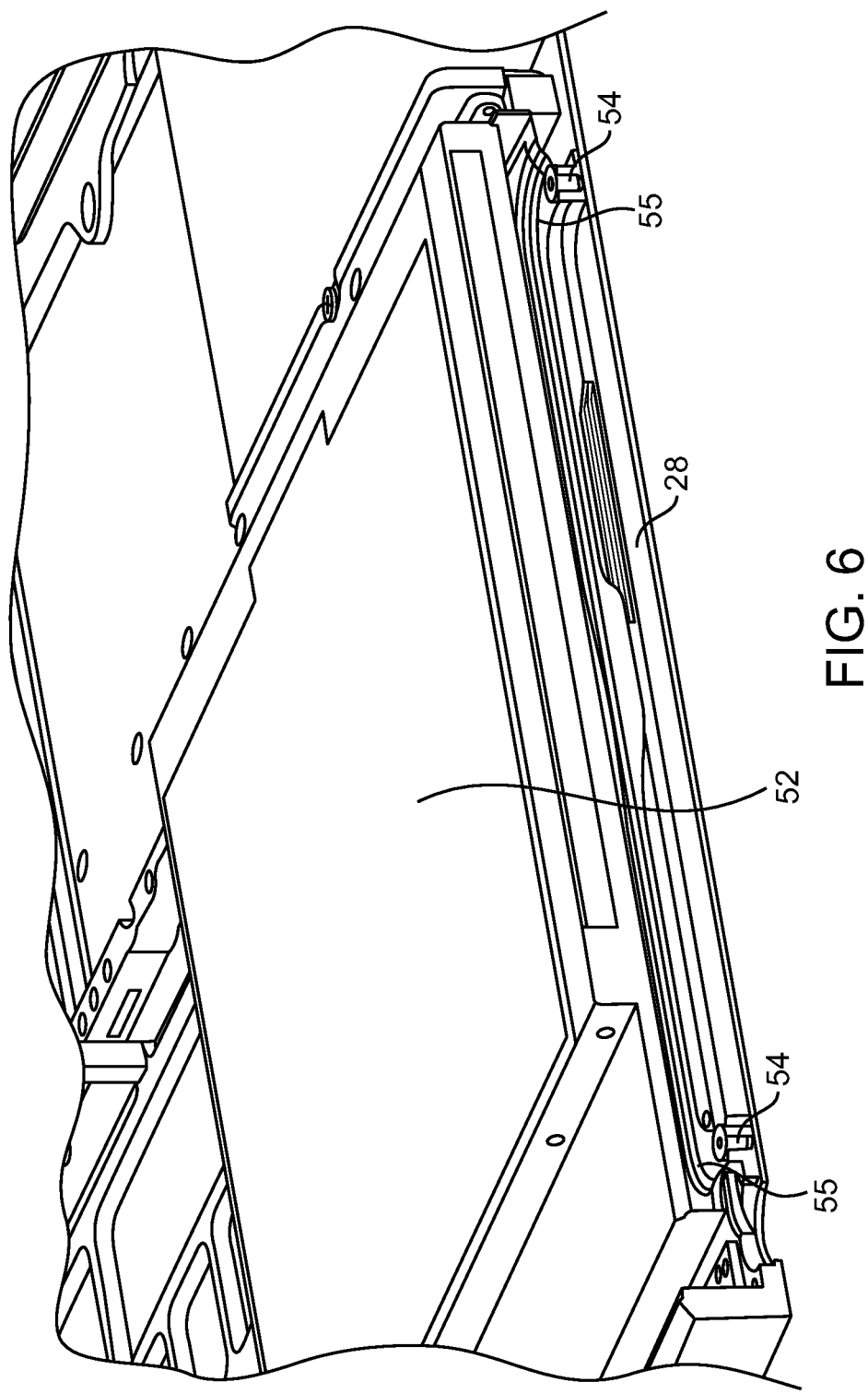
FIG. 6 is a cross-sectional perspective view of an illustrative optical disk drive in a portable computer which may be form fitted to mount directly to the portable computer in accordance with an embodiment of the present invention.

As shown in FIG. 6, device 10 may have an electrical component such as optical disk drive ODD 52 or other storage component. Drive 52 may have a housing or other suitable structures that are adapted to conform to the shape of the housing or other structures within device 10. For example, drive 52 may have portions 55 which are formed to mate with the contours of the inner surface of lower housing portion 28. This may allow direct mounting of drive 52 to corresponding mounting structures in lower housing portion 28. With one particularly suitable arrangement, which is shown in the example of FIG. 6, drive 52 may be mounted to lower housing portion 28 without the use of additional hardware (e.g., without the use of mounting brackets). Screws 54 may be passed through holes in portions 55 and screwed into corresponding threaded portions of housing 28. Portions 55 of drive 52 may be structures that are an integral part of the housing of drive 52. This drive housing may be formed from metal, plastic, or other suitable materials. Drive 52 may be an optical drive, a hard disk drive, a solid state drive, or any other suitable storage component or electrical device.

Figure 7:
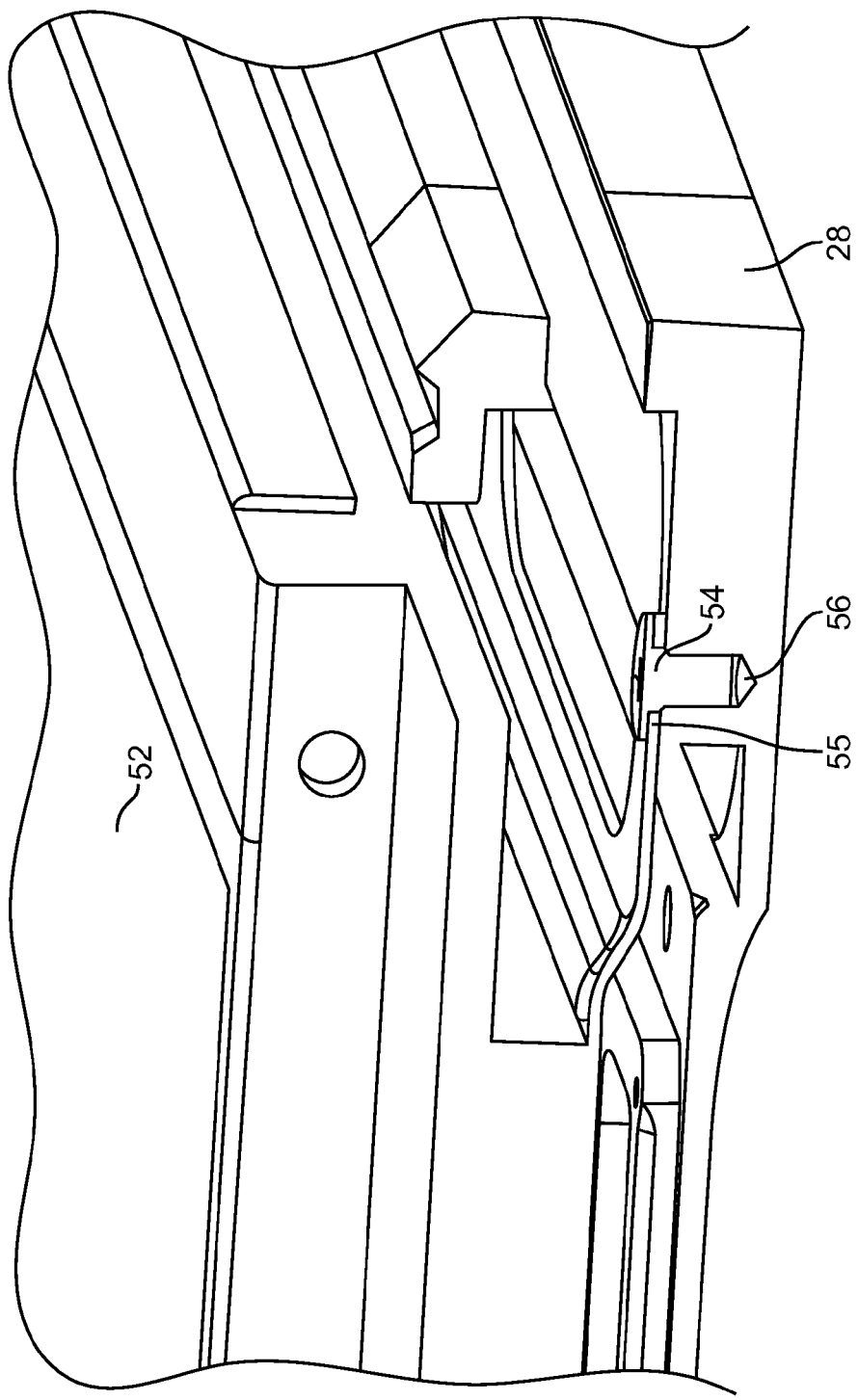
FIG. 7 is a cross-sectional perspective view of an illustrative optical disk drive in a portable computer which may be form fitted to mount to the portable computer in accordance with an embodiment of the present invention.

FIG. 7 shows a close-up view of drive 52 and one of the integral drive housing structures (e.g., one of portions 55) which can be form fitted to allow mounting to device 10 using screws 54. As shown in FIG. 7, portion 55 may be formed into a shape that has a screw hole that allows screw 54 to pass through portion 55 and fit into corresponding threaded recess 56 of lower housing portion 28.

Figure 8:
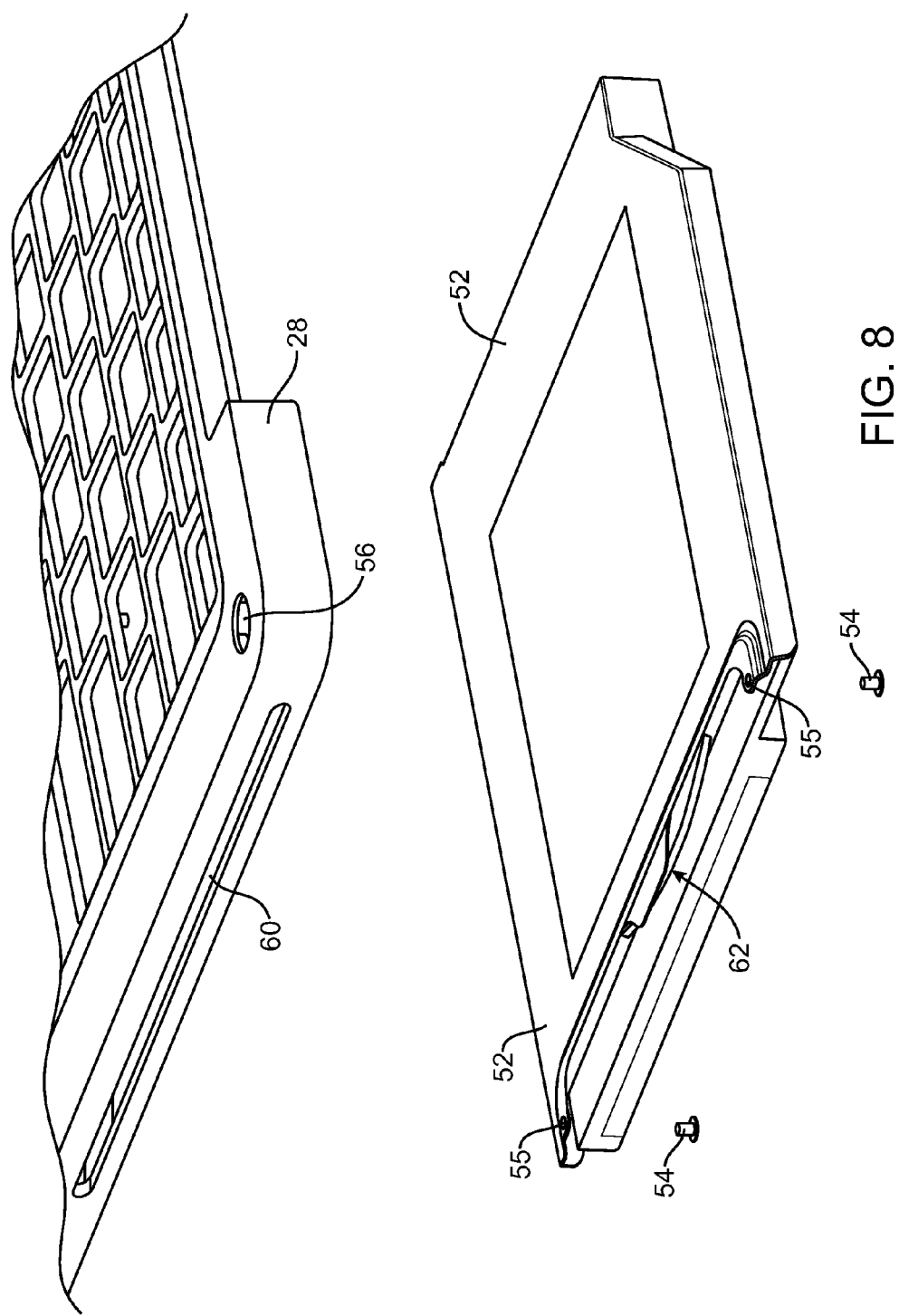
FIG. 8 is an exploded perspective view of an illustrative optical disk drive in a portable computer which may be form fitted to mount to the portable computer in accordance with an embodiment of the present invention.

FIG. 8 shows an exploded perspective view of drive 52. As shown in FIG. 8, drive 52 may have portions 55 which are form fitted to mount to lower housing portion 28. With one suitable arrangement, drive 52 may be mounted to lower housing portion 28 by inserting screws 54 through portions 55 of drive 52 into screw holes 56 (e.g., threaded recesses 56) of lower housing portion 28.

Drive 52 may have optical disk slot 62. Optical disk slot 62 may accept disks into and eject disks out of drive 52. When drive 52 is mounted to lower housing portion 28, disks which are inserted into or ejected from slot 62 and drive 52 may pass through disk opening 60 in lower housing portion 28.

If desired, drive 52 may be chamfered (narrowed) along an edge (e.g., an edge such as the edge associated with optical disk slot 62). By chamfering drive 52 along the edge of slot 62, it may be possible to mount drive 52 against the edge of housing portion 28 (e.g., directly against the edge of housing 28 associated with opening 60) even when the interior depth of housing 28 is narrowed (tapered) near the edge of housing 28.

Figure 9:
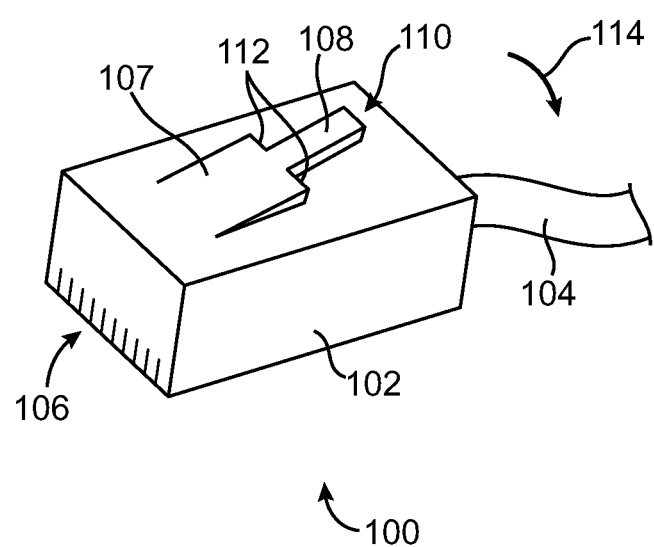
FIG. 9 is a perspective view of an illustrative communications cable connector such as an Ethernet plug that may be inserted into a communications port connector structure in a portable computer in accordance with an embodiment of the present invention.

An illustrative Ethernet plug (RJ45 plug) is shown in FIG. 9. As shown in FIG. 9, plug 100 may have a main body formed from plastic or other suitable materials. A cable such as an Ethernet cable 104 may be connected to body 102. Wires in cable 104 may be respectively connected to electrical contacts 106. Movable portion (bendable portion) 110 of plug 100 may be used to retain plug 100 in a connector port in device 10 such a port 32. When plug 100 is inserted into port 32, the upper planar inner surface of housing 28 (portion 40 in FIG. 3) bears against movable portion 110 (e.g., along surface 107 and surface 108). This bends portion 110 downwards in direction 114. Once inserted within port 32, the vertical inner walls of retaining structures 42 in port 32 bear against vertical wall portions 112 of movable portion 110, retaining plug 100 in port.

The foregoing is merely illustrative of the principles of this invention and various modifications can be made by those skilled in the art without departing from the scope and spirit of the invention.

What is claimed is:

1. A portable electronic device, comprising:
   a portable electronic device housing; and
   a connector port having an opening configured to receive a cable connector having a moveable portion, the connector port comprising:
      an inner surface portion formed from part of the electronic device housing that bears against the cable connector when the cable connector is inserted within the connector port; and
      retaining structures within the opening configured to engage with the moveable portion of the cable connector when the cable connector is inserted within the connector port.

2. The portable electronic device defined in claim 1 wherein the cable connector has a rigid portion and wherein the moveable portion is configured to move with respect to the rigid portion.

3. The portable electronic device defined in claim 1 wherein the portable electronic device housing comprises a portable electronic device metal housing.

4. The portable electronic device defined in claim 1 wherein the cable connector has a perimeter and wherein the inner surface portion substantially surrounds the perimeter of the cable connector when the cable connector is inserted within the connector port.

5. The portable electronic device defined in claim 1 further comprising at least one grounding structure adjacent to the electronic device housing configured to electrically ground the cable connector when the cable connector is inserted within the connector port.

6. The portable electronic device defined in claim 1 wherein the moveable portion is configured to reside behind the retaining structures when the retaining structures are engaged with the moveable portion of the cable connector.

7. The portable electronic defined in claim 1 further comprising a plurality of electrical contacts that mate with corresponding electrical contacts in the cable connector.

8. The portable electronic device defined in claim 1 wherein the portable electronic device is a handheld computer.

9. The portable electronic device defined in claim 1 where in the portable electronic device housing comprises aluminum.

10. The portable electronic device defined in claim 1 wherein the retaining structures are permanently fixed to the connector port.

11. A portable electronic device, comprising:
  a portable electronic device metal housing; and
  a connector port configured to receive a cable connector having a moveable portion, the connector port comprising:
    an inner surface portion formed from part of the electronic device metal housing that bears against the cable connector when the cable connector is inserted within the connector port; and
    at least one grounding structure adjacent to the electronic device metal housing configured to electrically ground the cable connector when the cable connector is inserted within the connector port.

12. The portable electronic device defined in claim 11 further comprising a plurality of electrical contacts that mate with corresponding electrical contacts in the cable connector.

13. The portable electronic device defined in claim 11 wherein the connector port further comprises
  an opening configured to receive the cable Connector; and
  retaining structures within the opening that engage with the cable connector when it is inserted in the connector port and that are configured to resist disengagement of the cable connector.

14. The portable electronic device defined in claim 11 wherein the inner surface portion bears against the moveable portion of the cable connector when the cable connector is inserted within the connector port.

15. A handheld electronic device, comprising:
  a touch sensitive surface;
  a handheld electronic device housing; and
  a connector port in the handheld electronic device housing configured to receive a cable connector, the connector port comprising:
    an inner surface portion formed from part of the handheld electronic device housing that bears against the cable connector when the cable connector is inserted within the connector port.

16. The handheld electronic device defined in claim 15 wherein the touch sensitive surface is located on a first surface of the handheld electronic device, wherein the connector port is located in a second surface of the handheld electronic device, and wherein the first and second surfaces are not parallel to each other.

17. The handheld electronic device defined in claim 15 wherein the touch sensitive surface is located on a first surface of the handheld electronic device, wherein the connector port is located in a second surface of the handheld electronic device, wherein the first and second surfaces are perpendicular to each other.

18. The handheld electronic device defined in claim 15 further comprising at least one grounding structure adjacent to the handheld electronic device housing configured to electrically ground the cable connector when the cable connector is inserted within the connector port.

19. The handheld electronic device defined in claim 15 wherein the connector port is configured to receive an RJ45 plug.

20. The handheld electronic device defined in claim 15 further comprising a display mounted in the handheld electronic device housing.

21. The handheld electronic device defined in claim 15 wherein the touch sensitive surface is mounted within the handheld electronic device housing.

22. The handheld electronic device defined in claim 14 wherein the connector port further comprises:
  an opening configured to receive the cable connector; and
  retaining structures within the opening that engage with the cable connector when it is inserted in the connector port.

* * * * *